United States Patent
Okubo et al.

(10) Patent No.: US 11,929,972 B2
(45) Date of Patent: Mar. 12, 2024

(54) INFORMATION PROCESSING METHOD AND DEVICE FOR NOTIFYING CONDITIONS OF APPLIANCE

(71) Applicant: Panasonic Intellectual Property Management Co., Ltd., Osaka (JP)

(72) Inventors: Masafumi Okubo, Kyoto (JP); Mariko Nakaso, Shiga (JP); Hiroko Sugimoto, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/630,891

(22) PCT Filed: Dec. 18, 2020

(86) PCT No.: PCT/JP2020/047580
§ 371 (c)(1),
(2) Date: Jan. 27, 2022

(87) PCT Pub. No.: WO2021/171754
PCT Pub. Date: Sep. 2, 2021

(65) Prior Publication Data
US 2022/0286421 A1    Sep. 8, 2022

(30) Foreign Application Priority Data

Feb. 27, 2020 (JP) ................................. 2020-031105

(51) Int. Cl.
*H04L 51/224* (2022.01)
*H04L 12/28* (2006.01)
(Continued)

(52) U.S. Cl.
CPC ........ *H04L 51/224* (2022.05); *H04L 12/2818* (2013.01); *H04L 51/226* (2022.05); *H04L 67/55* (2022.05)

(58) Field of Classification Search
CPC ............. H04L 12/2803; H04L 12/2816; H04L 12/2818; H04L 51/224; H04L 51/226; H04L 67/55
See application file for complete search history.

(56) References Cited

U.S. PATENT DOCUMENTS 9,461,953 B2    10/2016   Hideishi et al.
11,315,394 B1*   4/2022   Jackson ................. G08B 13/18
(Continued)

FOREIGN PATENT DOCUMENTS

JP    2002-186065 A    6/2002
JP    2002-236576 A    8/2002
(Continued)

OTHER PUBLICATIONS

International Search Report issued in corresponding International Patent Application No. PCT/JP2020/047580, dated Mar. 23, 2021, with English translation.

*Primary Examiner* — Jeong S Park
(74) *Attorney, Agent, or Firm* — Rimon, P.C.

(57) ABSTRACT

An information processing method executed by a computer to control notification by a plurality of terminals (first terminal and second terminal) associated with an appliance includes: obtaining information defining, for each state of a plurality of possible states of the appliance, whether the state is a predetermined state that requires the notification by all of the first terminal and the second terminal; obtaining a state of the appliance; determining whether the state of the appliance obtained is the predetermined state; performing control to cause all of the first terminal and the second terminal to make the notification, when it is determined that (Continued)

the state of the appliance is the predetermined state; and performing control to cause a specific terminal out of the first terminal and the second terminal to make the notification, when it is determined that the state of the appliance is not the predetermined state.

9 Claims, 6 Drawing Sheets

(51) Int. Cl.
*H04L 51/226* (2022.01)
*H04L 67/55* (2022.01)

(56) References Cited

U.S. PATENT DOCUMENTS

| | | |
|---|---|---|
| 2003/0037287 A1 | 2/2003 | Nakamura et al. |
| 2005/0246418 A1 | 11/2005 | Tanaka et al. |
| 2006/0058046 A1 | 3/2006 | Matsuura et al. |
| 2006/0123151 A1* | 6/2006 | Wurst ................ G06F 3/1207 710/19 |
| 2009/0187650 A1* | 7/2009 | Cervantes ............ G06Q 10/107 709/224 |
| 2010/0105445 A1* | 4/2010 | Brunton .............. H04M 1/6066 455/567 |
| 2010/0174680 A1 | 7/2010 | Yamagishi et al. |
| 2011/0032107 A1* | 2/2011 | Sasaki ................. A61M 60/531 600/300 |
| 2013/0151703 A1 | 6/2013 | Nakaso et al. |
| 2014/0251987 A1* | 9/2014 | Reay ....................... F24C 7/088 219/446.1 |
| 2015/0046580 A1* | 2/2015 | Sasagawa ........... H04L 41/0816 709/224 |
| 2015/0156074 A1* | 6/2015 | Yamada ................ G06Q 10/10 700/275 |
| 2016/0006576 A1* | 1/2016 | Matsuzaki ............ G06Q 10/00 709/224 |
| 2019/0307931 A1* | 10/2019 | Frondelius .......... A61M 39/223 |
| 2020/0243083 A1 | 7/2020 | Nagasaka |
| 2020/0244475 A1 | 7/2020 | Hayashi |

FOREIGN PATENT DOCUMENTS

| | | |
|---|---|---|
| JP | 2002-267487 A | 9/2002 |
| JP | 2004-234644 A1 | 8/2004 |
| JP | 2005-341544 A | 12/2005 |
| JP | 2007-086901 A1 | 4/2007 |
| JP | 2009-116846 A1 | 5/2009 |
| JP | 4400537 B2 | 1/2010 |
| JP | 2010-288231 A | 12/2010 |
| JP | 5298626 B2 | 9/2013 |
| JP | 2014-164523 A | 9/2014 |
| JP | 2015-018502 A | 1/2015 |
| JP | 2015-95721 A | 5/2015 |
| JP | 2016-187158 A | 10/2016 |
| JP | 2017-211889 A | 11/2017 |
| JP | 2017-216572 A | 12/2017 |
| JP | 2019-175214 A | 10/2019 |
| WO | 2013/001701 A1 | 1/2013 |
| WO | 2017/077791 A1 | 5/2017 |
| WO | 2019/031007 A1 | 2/2019 |

* cited by examiner

FIG. 2

| Importance | State of appliance | | | Appliance | Terminal to make notification | | Notification mode | Notification timing |
|---|---|---|---|---|---|---|---|---|
| High | Leakage detected | | | Distribution board | All of plurality of terminals | | Display + sound | - Notify immediately<br>- Periodically notify until user confirms |
| | Power failure detected | | | | | | | |
| | ... | | | ... | | | | |
| Medium | Washing halt | Water tap closed | | Washing machine | | - Person at home<br>- Person near home<br>- Person in charge of appliance (e.g. operating personnel)<br>- Person with high appliance operation frequency | Display | - Notify once immediately<br>- Notify according to number of operations until user confirms<br>- Check state and notify before operation start |
| | | Filter clogged | | | Only main person responsible | | | |
| | | ... | | | | | | |
| | 1 hr before washing start | | | | | | | |
| | Low remaining detergent/softener level | | | | | | | |
| | ... | | | ... | | | | |
| Low | Normal washing (start/end) | | | Washing machine | Only main terminal | - Terminal operated most recently<br>- Permanently home-installed terminal<br>- Terminal near main person responsible<br>- Mobile terminal | - Display<br>- Display update | - Notify once immediately |
| | ... | | | ... | | | | |

INFORMATION PROCESSING METHOD AND DEVICE FOR NOTIFYING CONDITIONS OF APPLIANCE

CROSS-REFERENCE OF RELATED APPLICATIONS

This application is the U.S. National Phase under 35 U.S.C. § 371 of International Patent Application No. PCT/JP2020/047580, filed on Dec. 18, 2020, which in turn claims the benefit of Japanese Application No. 2020-031105, filed on Feb. 27, 2020, the entire disclosures of which Applications are incorporated by reference herein.

TECHNICAL FIELD

The present invention relates to an information processing method, an information processing device, and a recording medium.

BACKGROUND ART

Message notification devices that determine the timings of writing messages about the states of appliances such as air conditioners to home message boards are conventionally disclosed (for example, Patent Literature (PTL) 1). A message notification device in PTL 1 determines the timing of writing a message based on the urgency of the message and the frequency of writing to a family message board by each family member. The message written to the family message board is notified to each family member.

CITATION LIST

Patent Literature

[PTL 1]
Japanese Unexamined Patent Application Publication No. 2014-164523

SUMMARY OF INVENTION

Technical Problem

However, the message notification device in PTL 1 notifies the message written to the family message board even to a member who does not need to be notified. This causes an increase in communication volume.

The present invention therefore has an object of providing an information processing method, etc. that can prevent an increase in communication volume.

Solution to Problem

To achieve the object stated above, an aspect of an information processing method according to the present invention is an information processing method executed by a computer to control notification by a plurality of terminals associated with an appliance, the information processing method including: obtaining information defining, for each state of a plurality of possible states of the appliance, whether the state is a predetermined state that requires the notification by all of the plurality of terminals; obtaining a state of the appliance; determining whether the state of the appliance obtained is the predetermined state; performing control to cause all of the plurality of terminals to make the notification, when it is determined that the state of the appliance is the predetermined state; and performing control to cause a specific terminal out of the plurality of terminals to make the notification, when it is determined that the state of the appliance is not the predetermined state.

To achieve the object stated above, an aspect of an information processing device according to the present invention is an information processing device that controls notification by a plurality of terminals associated with an appliance, the information processing device including: a first obtainer that obtains information defining, for each state of a plurality of possible states of the appliance, whether the state is a predetermined state that requires the notification by all of the plurality of terminals; a second obtainer that obtains a state of the appliance; a determiner that determines whether the state of the appliance obtained is the predetermined state; and a controller that performs control to cause all of the plurality of terminals to make the notification when the determiner determines that the state of the appliance is the predetermined state, and performs control to cause a specific terminal out of the plurality of terminals to make the notification when the determiner determines that the state of the appliance is not the predetermined state.

To achieve the object stated above, an aspect of a recording medium according to the present invention is a non-transitory computer-readable recording medium having recorded thereon a program for causing a computer to execute the above-described information processing method.

Advantageous Effects of Invention

According to the present invention, it is possible to obtain an information processing method, etc. that can prevent an increase in communication volume.

BRIEF DESCRIPTION OF DRAWINGS

FIG. 2 is a diagram illustrating an example of information defining, for each possible state of an appliance, whether the state is a predetermined state.

DESCRIPTION OF EMBODIMENTS

An embodiment of the present invention will be described below. The embodiment described below shows a preferred specific example according to the present invention. The numerical values, structural elements, the arrangement and connection of the structural elements, steps, the processing order of the steps etc. shown in the following embodiment are mere examples, and do not limit the scope of the present invention.

Each drawing is a schematic and does not necessarily provide precise depiction. The substantially same structural elements are given the same reference marks throughout the drawings, and repeated description is omitted or simplified.

Figure 1:
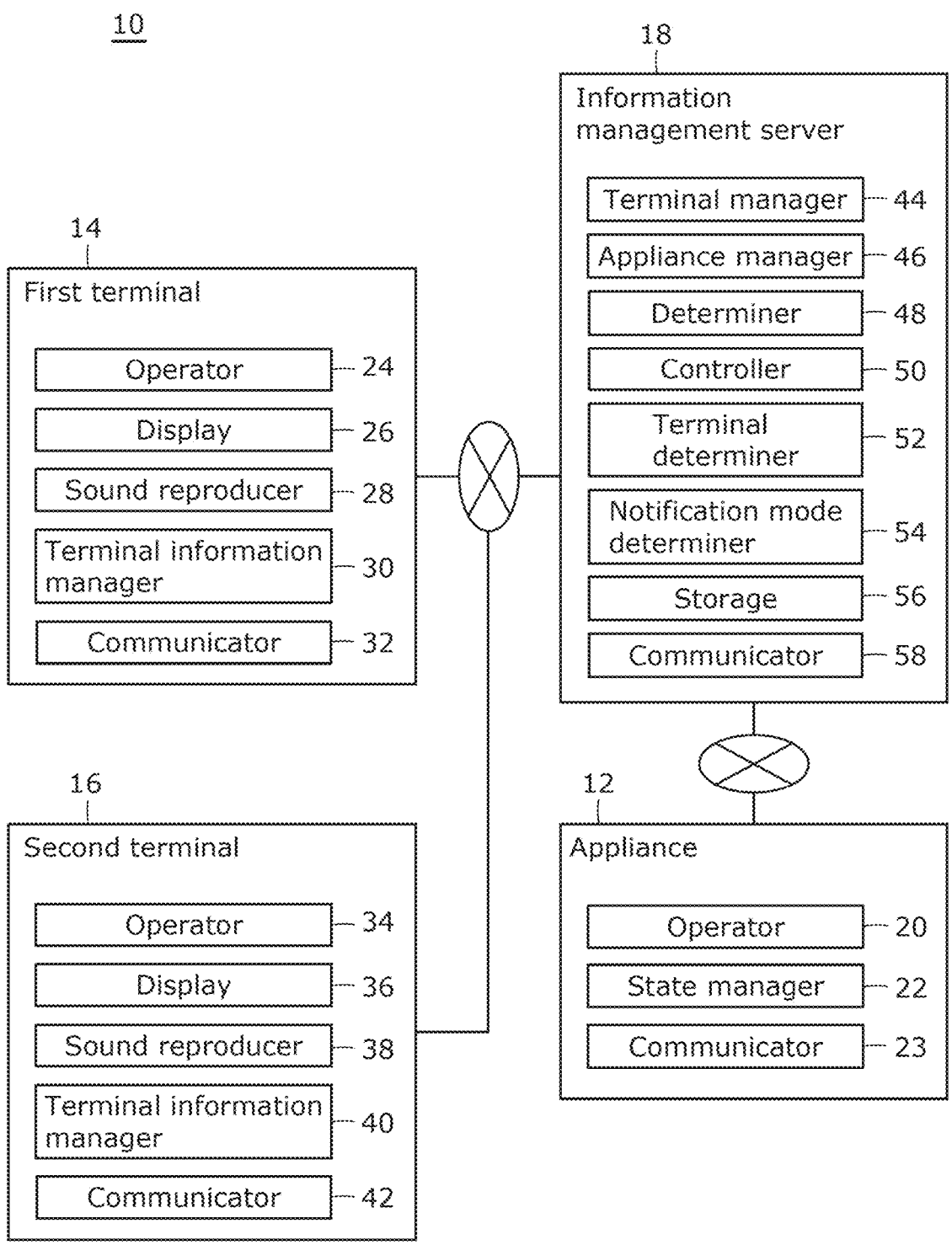
FIG. 1 is a block diagram illustrating an information processing system according to an embodiment.

FIG. 1 is a block diagram illustrating information processing system 10 according to an embodiment. Information processing system 10 according to the embodiment will be described below, with reference to FIG. 1.

Information processing system 10 includes appliance 12, first terminal 14, second terminal 16, and information management server 18, as illustrated in FIG. 1. Thus, information processing system 10 includes a plurality of terminals (first terminal 14 and second terminal 16). Information processing system 10 is a system that controls notification by first terminal 14 and second terminal 16 that are associated with appliance 12. For example, appliance 12 is an appliance such as an IoT (Internet of Things) home appliance or IoT equipment shared by a plurality of persons living together such as a married couple, and first terminal 14 and second terminal 16 are smartphones associated with appliance 12. Information processing system 10 controls whether to notify by all of first terminal 14 and second terminal 16 or by a specific terminal out of first terminal 14 and second terminal 16, depending on the state of appliance 12. This will be described in detail below.

Appliance 12 is, for example, a home appliance such as a washing machine, a refrigerator, an air conditioner, or a lighting appliance or equipment such as a distribution board, and is installed in a house, the site of the house, or the like. Appliance 12 is, for example, an IoT home appliance or IoT equipment. Appliance 12 includes operator 20, state manager 22, and communicator 23.

Operator 20 receives operation by a user for operating appliance 12. Operator 20 is, for example, implemented by a touch panel, hardware buttons, and the like.

State manager 22 manages the state of appliance 12. The state of appliance 12 will be described in detail later, but examples of the state of appliance 12 include a state in which appliance 12 is normal, a state in which appliance 12 is not normal, and a state in which appliance 12 detects anomaly. State manager 22 transmits the state of appliance 12 to information management server 18 via communicator 23. State manager 22 is implemented by a microcomputer as an example, but may be implemented by a processor or the like.

Communicator 23 is a communication module (communication circuit) for appliance 12 communicating with first terminal 14, second terminal 16, and information management server 18.

First terminal 14 is, for example, a mobile terminal such as a smartphone or a tablet, or a permanent terminal permanently installed in the house, such as a television. First terminal 14 is a terminal owned by a first user, and associated with the first user. First terminal 14 includes operator 24, display 26, sound reproducer 28, terminal information manager 30, and communicator 32.

Operator 24 receives operation by the user for operating first terminal 14. First terminal 14 is capable of operating appliance 12, and operator 24 also receives operation by the user for operating appliance 12. Operator 24 is, for example, implemented by a touch panel, hardware buttons, and the like.

Display 26 is used to make notification about appliance 12. Specifically, display 26 is a display screen for displaying the state of appliance 12 and the like. The notification by first terminal 14 is made by display 26 displaying the state of appliance 12 and the like. Display 26 is, for example, a display screen such as a liquid crystal screen or an organic electroluminescence (EL) screen.

Sound reproducer 28 is used to make notification about appliance 12. Specifically, sound reproducer 28 reproduces sound stored in first terminal 14, sound transmitted from information management server 18, or the like. The notification by first terminal 14 is made by sound reproducer 28 reproducing sound. Sound reproducer 28 is, for example, implemented by a speaker and the like.

Terminal information manager 30 manages first terminal information which is information about first terminal 14. The first terminal information includes position information of first terminal 14, operation history of first terminal 14, information of the first user associated with first terminal 14, etc. Terminal information manager 30 transmits the first terminal information to information management server 18 via communicator 32.

Communicator 32 is a communication module (communication circuit) for first terminal 14 communicating with appliance 12 and information management server 18.

Second terminal 16 is, for example, a mobile terminal such as a smartphone or a tablet, or a permanent terminal permanently installed in the house, such as a television. Second terminal 16 is a terminal owned by a second user different from the first user, and associated with the second user. Second terminal 16 includes operator 34, display 36, sound reproducer 38, terminal information manager 40, and communicator 42.

Operator 34 receives operation by the user for operating second terminal 16. Second terminal 16 is capable of operating appliance 12, and operator 34 also receives operation by the user for operating appliance 12. Operator 34 is, for example, implemented by a touch panel, hardware buttons, and the like.

Display 36 is used to make notification about appliance 12. Specifically, display 36 is a display screen for displaying the state of appliance 12 and the like. The notification by second terminal 16 is made by display 36 displaying the state of appliance 12 and the like. Display 36 is, for example, a display screen such as a liquid crystal screen or an organic electroluminescence (EL) screen.

Sound reproducer 38 is used to make notification about appliance 12. Specifically, sound reproducer 38 reproduces sound stored in second terminal 16, sound transmitted from information management server 18, or the like. The notification by second terminal 16 is made by sound reproducer 38 reproducing sound. Sound reproducer 38 is, for example, implemented by a speaker and the like.

Terminal information manager 40 manages second terminal information which is information about second terminal 16. The second terminal information includes position information of second terminal 16, operation history of second terminal 16, information of the second user associated with second terminal 16, etc. Terminal information manager 40 transmits the second terminal information to information management server 18 via communicator 42.

Communicator 42 is a communication module (communication circuit) for second terminal 16 communicating with appliance 12 and information management server 18.

Information management server 18 is a server that is a computer for controlling notification by the plurality of terminals (first terminal 14 and second terminal 16) associated with appliance 12. Information management server 18 is, for example, a cloud server. In this embodiment, information management server 18 corresponds to an information processing device. Information management server 18 includes terminal manager 44, appliance manager 46, determiner 48, controller 50, terminal determiner 52, notification mode determiner 54, storage 56, and communicator 58.

Terminal manager 44 manages first terminal 14 and second terminal 16. Specifically, terminal manager 44 obtains the first terminal information from first terminal 14 communicator 58, and manages first terminal 14 based on the first terminal information. Terminal manager 44 also obtains the second terminal information from second terminal 16 via communicator 58, and manages second terminal 16 based on the second terminal information. Moreover, terminal manager 44 manages the information of the first user associated with first terminal 14, the information of the second user associated with second terminal 16, etc.

Appliance manager 46 manages appliance 12. Specifically, appliance manager 46 obtains the state of appliance 12, the operation history of appliance 12, and the like from appliance 12 via communicator 58, and manages appliance 12. In this embodiment, appliance manager 46 corresponds to a second obtainer.

Determiner 48 determines whether the obtained state of appliance 12 is a predetermined state. The predetermined state is a state that requires notification by all of first terminal 14 and second terminal 16. Determiner 48 obtains information predefining, for each possible state of appliance 12, whether the state is the predetermined state, from storage 56. Using the information, determiner 48 determines whether the obtained state of appliance 12 is the predetermined state. In this embodiment, determiner 48 corresponds to a determiner and a first obtainer.

Controller 50 controls notification by first terminal 14 and second terminal 16. Specifically, in the case where determiner 48 determines that the obtained state of appliance 12 is the predetermined state, controller 50 performs control to cause all of first terminal 14 and second terminal 16 to make notification. Moreover, in the case where determiner 48 determines that the obtained state of appliance 12 is the predetermined state, controller 50 performs control to cause all of first terminal 14 and second terminal 16 to make notification in a first notification mode which is a mode of notification. The first notification mode is determined by notification mode determiner 54.

In the case where determiner 48 determines that the obtained state of appliance 12 is not the predetermined state, controller 50 performs control to cause a specific terminal out of first terminal 14 and second terminal 16 to make notification, and performs control to cause each terminal other than the specific terminal out of first terminal 14 and second terminal 16 not to make notification. Moreover, in the case where determiner 48 determines that the obtained state of appliance 12 is not the predetermined state, controller 50 performs control to cause the specific terminal to make notification in a second notification mode which is a mode of notification different from the first notification mode. The second notification mode is determined by notification mode determiner 54.

Terminal determiner 52 determines the specific terminal out of first terminal 14 and second terminal 16. For example, terminal determiner 52 determines the specific terminal out of first terminal 14 and second terminal 16 based on the first terminal information and the second terminal information. Specifically, for example, terminal determiner 52 determines the specific terminal based on the position information of first terminal 14 and the position information of second terminal 16. For example, terminal determiner 52 determines the specific terminal based on the operation history of first terminal 14 and the operation history of second terminal 16.

Notification mode determiner 54 determines a mode of notification by first terminal 14 and second terminal 16. Specifically, in the case of causing all of first terminal 14 and second terminal 16 to make notification, notification mode determiner 54 determines the first notification mode which is the mode of the notification. For example, the first notification mode includes a mode in which display 26 in first terminal 14 and display 36 in second terminal 16 each display the state of appliance 12 and sound reproducer 28 in first terminal 14 and sound reproducer 38 in second terminal 16 each reproduce sound. The colors displayed on display 26 and display 36 may be, for example, determined depending on the state of appliance 12.

In the case of causing the specific terminal out of first terminal 14 and second terminal 16 to make notification, notification mode determiner 54 determines the second notification mode which is the mode of the notification. For example, in the case where first terminal 14 is the specific terminal, the second notification mode includes only one of a mode in which display 26 in first terminal 14 displays the state of appliance 12 and a mode in which sound reproducer 28 in first terminal 14 reproduces sound. For example, in the case where second terminal 16 is the specific terminal, the second notification mode includes only one of a mode in which display 36 in second terminal 16 displays the state of appliance 12 and a mode in which sound reproducer 38 in second terminal 16 reproduces sound. The colors displayed on display 26 or display 36 may be, for example, determined depending on the state of appliance 12.

The first notification mode and the second notification mode may include a mode in which first terminal 14 and/or second terminal 16 is vibrated.

Terminal manager 44, appliance manager 46, determiner 48, controller 50, terminal determiner 52, and notification mode determiner 54 are implemented by a microcomputer as an example, but may be implemented by a processor or the like.

Storage 56 stores, for example, information defining, for each possible state of appliance 12, whether the state is the predetermined state. The information will be described later. Storage 56 also stores, for example, a control program executed by information management server 18. Storage 56 is, for example, implemented by semiconductor memory or the like.

Communicator 58 is a communication module (communication circuit) for information management server 18 communicating with appliance 12, first terminal 14, and second terminal 16.

The structure of information processing system 10 has been described above.

FIG. 2 is a diagram illustrating an example of the information defining, for each possible state of the appliance, whether the state is the predetermined state. An example of the information will be described below, with reference to FIG. 2.

As illustrated in FIG. 2, importance is set for each possible state of a plurality of appliances in the information. It is assumed here that a state whose importance is "high" is the predetermined state and a state whose importance is "medium" or "low" is not the predetermined state.

For example, leakage detected state, power failure detected state, and the like are registered as possible states of distribution boards. The importance of the leakage detected state and the importance of the power failure detected state are set to "high". Accordingly, the leakage detected state and the power failure detected state of distribution boards are each the predetermined state.

For example, washing halt state, state of 1 hr before washing start, low remaining detergent/softener level state, normal washing state, and the like are registered as possible states of washing machines. The importance of the washing halt state, the importance of the state of 1 hr before washing start, and the importance of the low remaining detergent/softener level state are set to "medium". Accordingly, the washing halt state, the state of 1 hr before washing start, and the low remaining detergent/softener level state of washing machines are each not the predetermined state. The importance of the normal washing state is set to "low". Accordingly, the normal washing state of washing machines is not the predetermined state.

In the information illustrated in FIG. 2, the terminal(s) to make notification, the notification mode, and the notification timing are set for each possible state of a plurality of appliances. For example, in the case of a state whose importance is "high", i.e. a state that is the predetermined state, all of the plurality of terminals are to make notification. The notification mode in this case is a mode in which the state of the appliance is displayed on the display screen of each of the plurality of terminals and sound is reproduced from each of the plurality of terminals. The notification timing in this case is that notification is made immediately after determining that the obtained state of the appliance is the predetermined state and subsequently the notification is made periodically until the user confirms the notification. Whether the user confirms the notification is determined based on, for example, whether the user taps the display screen.

For example, in the case of a state whose importance is "medium", i.e. a state that is not the predetermined state, a specific terminal out of the plurality of terminals is to make notification. In the case of a state whose importance is "medium", the specific terminal is a terminal of a main person responsible. Examples of the main person responsible include a user at home, a user near home, a user in charge of the appliance, and a user with high frequency of operating the appliance, and, for example, whether there is the main person responsible is determined in this order. The notification mode in this case is a mode in which the state of the appliance is displayed on the display screen of the specific terminal. The notification timing in this case is that notification is made once immediately after determining that the obtained state of the appliance is not the predetermined state, that notification is made repeatedly according to the number of operations of the appliance until the user confirms the notification, or that the state of the appliance is checked and notification is made before operation start of the appliance.

For example, in the case of a state whose importance is "low", i.e. a state that is not the predetermined state, a specific terminal out of the plurality of terminals is to make notification. In the case of a state whose importance is "low", the specific terminal is the terminal of the main person responsible. If there is no terminal of the main person responsible, the specific terminal is a main terminal. Examples of the main terminal include a terminal operated most recently, a permanently home-installed terminal, a terminal near the main person responsible, and a mobile terminal, and, for example, whether there is the main terminal is determined in this order. The notification mode in this case is a mode in which the state of the appliance is displayed on the display screen of the specific terminal or a mode in which the state of the appliance displayed on the display screen of the specific terminal is updated. The notification timing in this case is that notification is made once immediately after determining that the obtained state of the appliance is not the predetermined state.

An example of the information defining, for each possible state of the appliance, whether the state is the predetermined state has been described above.

Operation in information processing system 10 having the structure described above will be described below.

Figure 3:
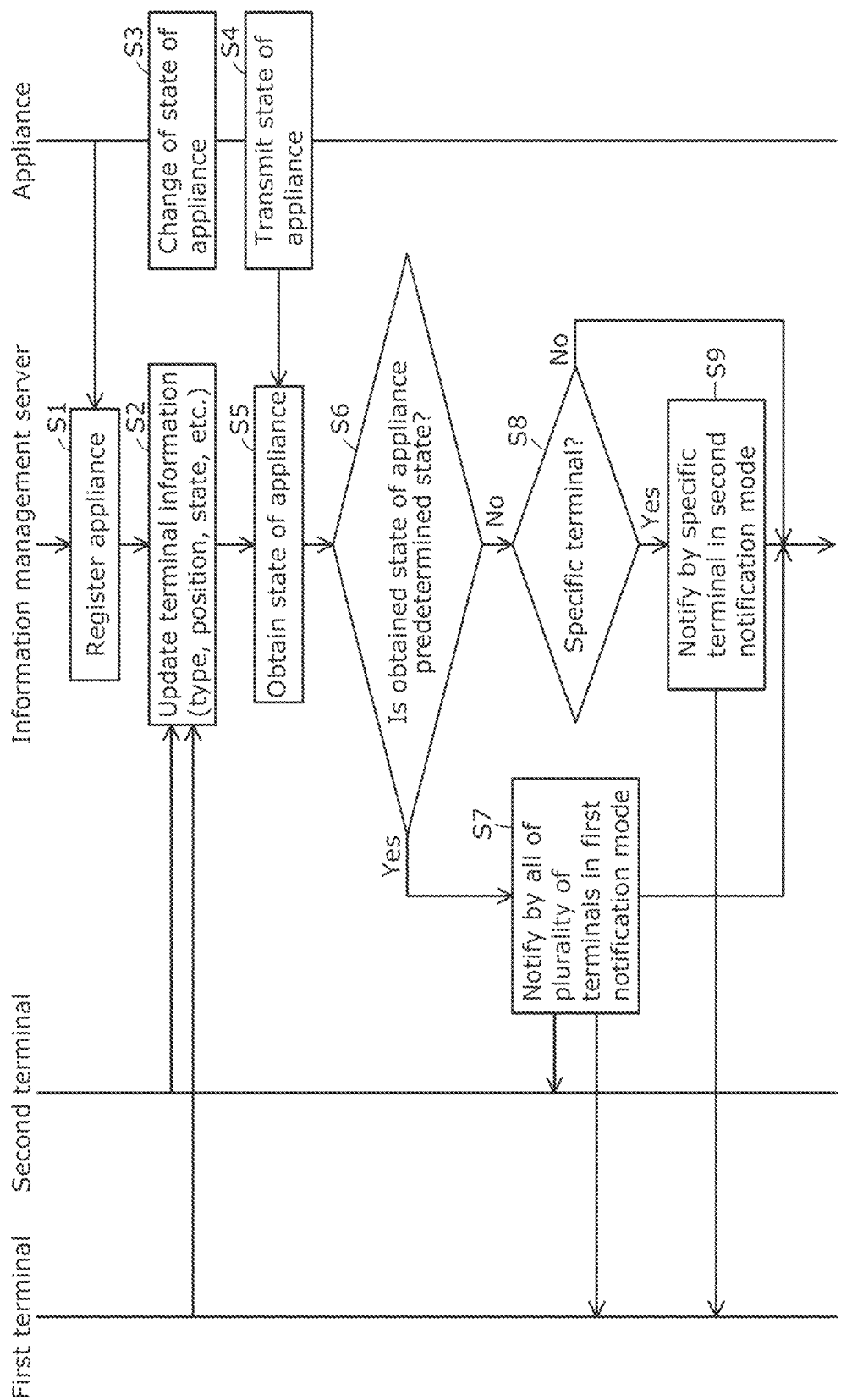
FIG. 3 is a flowchart illustrating an example of operation when an information management server controls notification by a plurality of terminals in the information processing system in FIG. 1.

FIG. 3 is a flowchart illustrating an example of operation when information management server 18 controls notification by first terminal 14 and second terminal 16 in information processing system in FIG. 1. An example of the operation of information management server 18 will be described below, with reference to FIG. 3.

As illustrated in FIG. 3, first, information management server 18 registers information of appliance 12 (Step S1). Specifically, as a result of a user operating appliance 12, information is transmitted from appliance 12 to information management server 18, and information management server 18 registers information of appliance 12 based on the information from appliance 12. For example, information management server 18 registers the type of appliance 12, the installation location of appliance 12, etc. Information of each of first terminal 14 and second terminal 16 is registered in information management server 18 beforehand, and, as a result of the information of appliance 12 being registered, appliance 12 is associated with and becomes communicable with first terminal 14 and second terminal 16.

After the information of appliance 12 is registered in information management server 18, information management server updates terminal information (Step S2). Specifically, information management server 18 communicates with first terminal 14 and obtains the first terminal information from first terminal 14. Information management server 18 also communicates with second terminal 16 and obtains the second terminal information from second terminal 16. For example, the first terminal information includes information such as the type of first terminal 14, the position of first terminal 14, the state of first terminal 14, the operation history of first terminal 14, and the information of the first user associated with first terminal 14. The state of first terminal 14 includes the power on/off state of first terminal 14. For example, the second terminal information includes information such as the type of second terminal 16, the position of second terminal 16, the state of second terminal 16, the operation history of second terminal 16, and the information of the second user associated with second terminal 16. The state of second terminal 16 includes the power on/off state of second terminal 16.

In the case where the state of appliance 12 changes after the registration of appliance 12 in information management server 18 ends (Step S3), appliance 12 transmits the state of appliance 12 to information management server 18 (Step S4).

For example, suppose appliance 12 is a distribution board. If leakage occurs, appliance 12 is in a leakage detected state. Hence, appliance 12 transmits information that appliance 12 is in a leakage detected state to information management server 18.

For example, suppose appliance 12 is a washing machine. 1 hr before delay washing start time, appliance 12 transmits information that appliance 12 is in a state of 1 hr before washing start to information management server 18.

As a result of the state of appliance 12 being transmitted from appliance 12 to information management server 18, information management server 18 obtains the state of appliance 12 (Step S5).

Having obtained the state of appliance 12, information management server 18 determines whether the obtained state of appliance 12 is the predetermined state (Step S6).

Specifically, determiner 48 in information management server 18 obtains information predefining, for each possible state of appliance 12, whether the state is the predetermined state from storage 56, and determines whether the obtained state of appliance 12 is the predetermined state using the information.

With reference to FIG. 2, for example, suppose appliance 12 is a distribution board. In the case where the obtained state of appliance 12 is the leakage detected state, information management server 18 references the information illustrated in FIG. 2, and determines that the importance of the leakage detected state is "high". In this case, information management server 18 determines that the obtained state of appliance 12 is the predetermined state.

For example, suppose appliance 12 is a washing machine. In the case where the obtained state of appliance 12 is the state of 1 hr before washing start, information management server 18 references the information illustrated in FIG. 2, and determines that the importance of the state of 1 hr before washing start is not "high". In this case, information management server 18 determines that the obtained state of appliance 12 is not the predetermined state.

Referring back to FIG. 3, in the case where information management server 18 determines that the obtained state of appliance 12 is the predetermined state (Step S6: Yes), information management server 18 determines the first notification mode as the notification mode, performs control to cause all of first terminal 14 and second terminal 16 to make notification in the first notification mode (Step S7), and ends the process.

Specifically, information management server 18 transmits a command to make notification in the first notification mode to first terminal 14 and second terminal 16, and ends the process. Information management server 18 also transmits a command to make notification at predetermined notification timing to first terminal 14 and second terminal 16. Here, the first notification mode is a mode in which the state of appliance 12 is displayed on each of display 26 in first terminal 14 and display 36 in second terminal 16 and sound is reproduced from each of sound reproducer 28 in first terminal 14 and sound reproducer 38 in second terminal 16, and the notification timing is immediate notification.

First terminal 14 that has received the command makes notification by displaying the state of appliance 12 on display 26 and reproducing sound from sound reproducer 28 immediately after receiving the command. Second terminal 16 that has received the command makes notification by displaying the state of appliance 12 on display 36 and reproducing sound from sound reproducer 38 immediately after receiving the command.

In the case where information management server 18 determines that the obtained state of appliance 12 is not the predetermined state (Step S6: No), information management server 18 determines whether there is a specific terminal out of first terminal 14 and second terminal 16 (Step S8). For example, information management server 18 determines whether there is a main person responsible out of the first user and the second user. If there is a main person responsible, information management server 18 determines a terminal of the main person responsible as the specific terminal, and determines that there is the specific terminal. If there is no main person responsible, information management server 18 determines that there is no specific terminal. The determination of whether there is the specific terminal will be described later.

In the case where information management server 18 determines that there is no specific terminal (Step S8: No), information management server 18 ends the process without performing control to cause first terminal 14 and second terminal 16 to make notification. Specifically, information management server 18 ends the process without transmitting the command to make notification to first terminal 14 and second terminal 16.

In the case where information management server 18 determines that there is the specific terminal (Step S8: Yes), information management server 18 determines the second notification mode, performs control to cause the specific terminal to make notification in the second notification mode (Step S9), and ends the process.

Specifically, information management server 18 transmits a command to make notification in the second notification mode to the specific terminal out of first terminal 14 and second terminal 16, without transmitting the command to make notification to any terminal other than the specific terminal out of first terminal 14 and second terminal 16. Thus, in the case where information management server 18 determines that there is the specific terminal, information management server 18 performs control to cause the specific terminal to make notification in the second notification mode, and also performs control to cause each terminal other than the specific terminal not to make notification. Information management server 18 also transmits a command to make notification at predetermined notification timing to the specific terminal. Here, the second notification mode is a mode in which the state of appliance 12 is displayed on the display screen of the specific terminal, and the notification timing is immediate notification.

For example, in the case where first terminal 14 is the specific terminal, information management server 18 performs control to cause first terminal 14 to make notification in the second notification mode by transmitting the command to first terminal 14 and performs control to cause each terminal other than first terminal 14 not to make notification by not transmitting the command to any terminal, i.e. second terminal 16, other than first terminal 14, as illustrated in FIG. 3. First terminal 14 that has received the command makes notification by displaying the state of appliance 12 on display 26 immediately after receiving the command. For example, in the case where first terminal 14 is a smartphone, the state of appliance 12 is displayed on the screen of the smartphone to thus make notification by first terminal 14. For example, in the case where first terminal 14 is a television, the state of appliance 12 is displayed on the screen of the television to thus make notification by first terminal 14.

The timing of making notification by the specific terminal may be determined, for example, based on the operation history of the specific terminal. As an example, notification may be made in a time of day during which the operation frequency of the specific terminal is high. In this case, the specific terminal that has received the command from information management server 18 makes notification when the time of day has come after receiving the command, instead of making notification immediately after receiving the command. As another example, notification may be made immediately after the specific terminal is operated by the user. In this case, the specific terminal that has received the command from information management server 18 makes notification immediately after being operated by the user after receiving the command, instead of making notification immediately after receiving the command. Thus, the timing of making notification may be determined so that the user can easily confirm the notification, depending on the obtained state of appliance 12.

Figure 4:
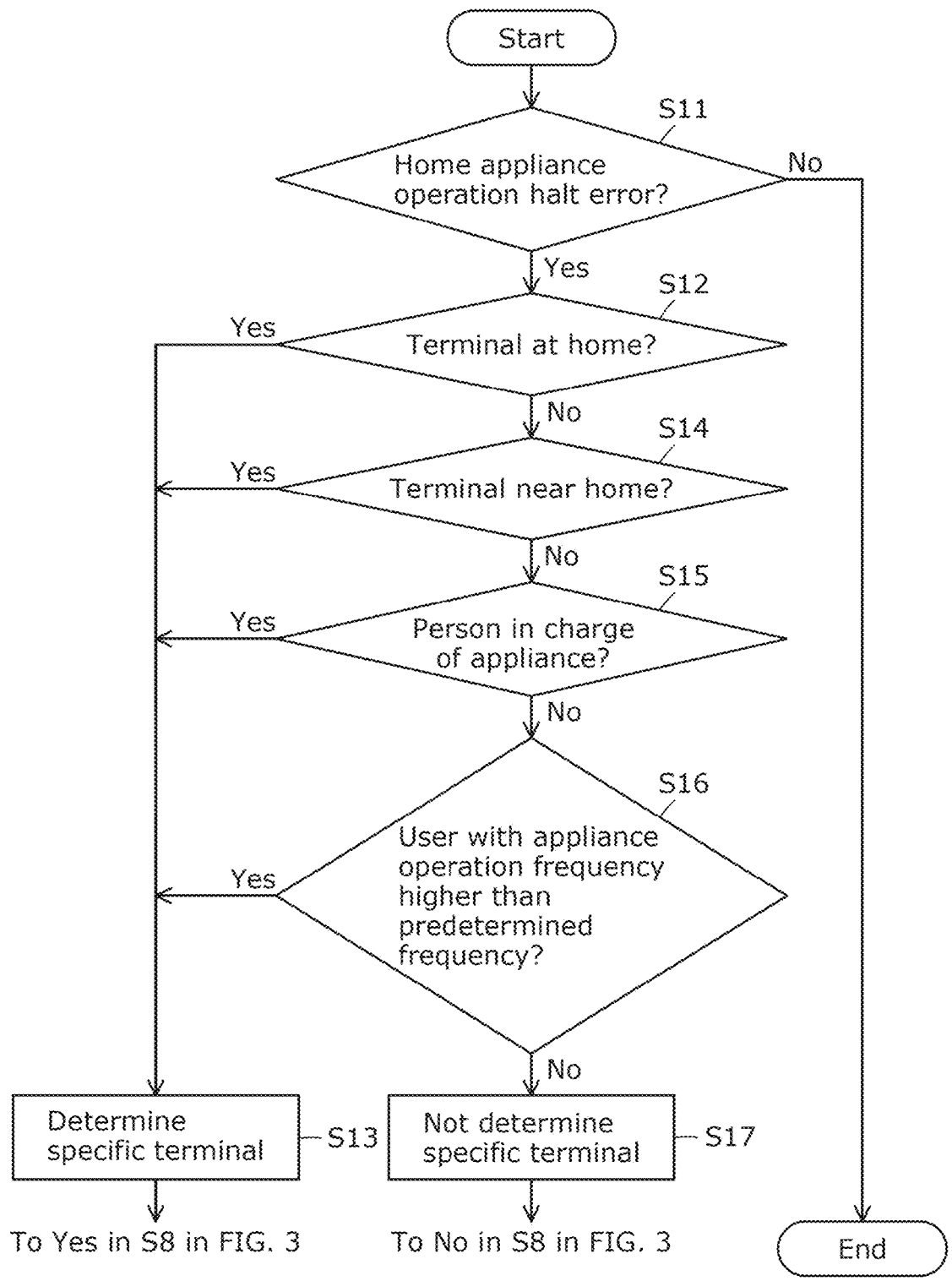
FIG. 4 is a flowchart illustrating an example of operation in Step S8 in FIG. 3.
Figure 5:
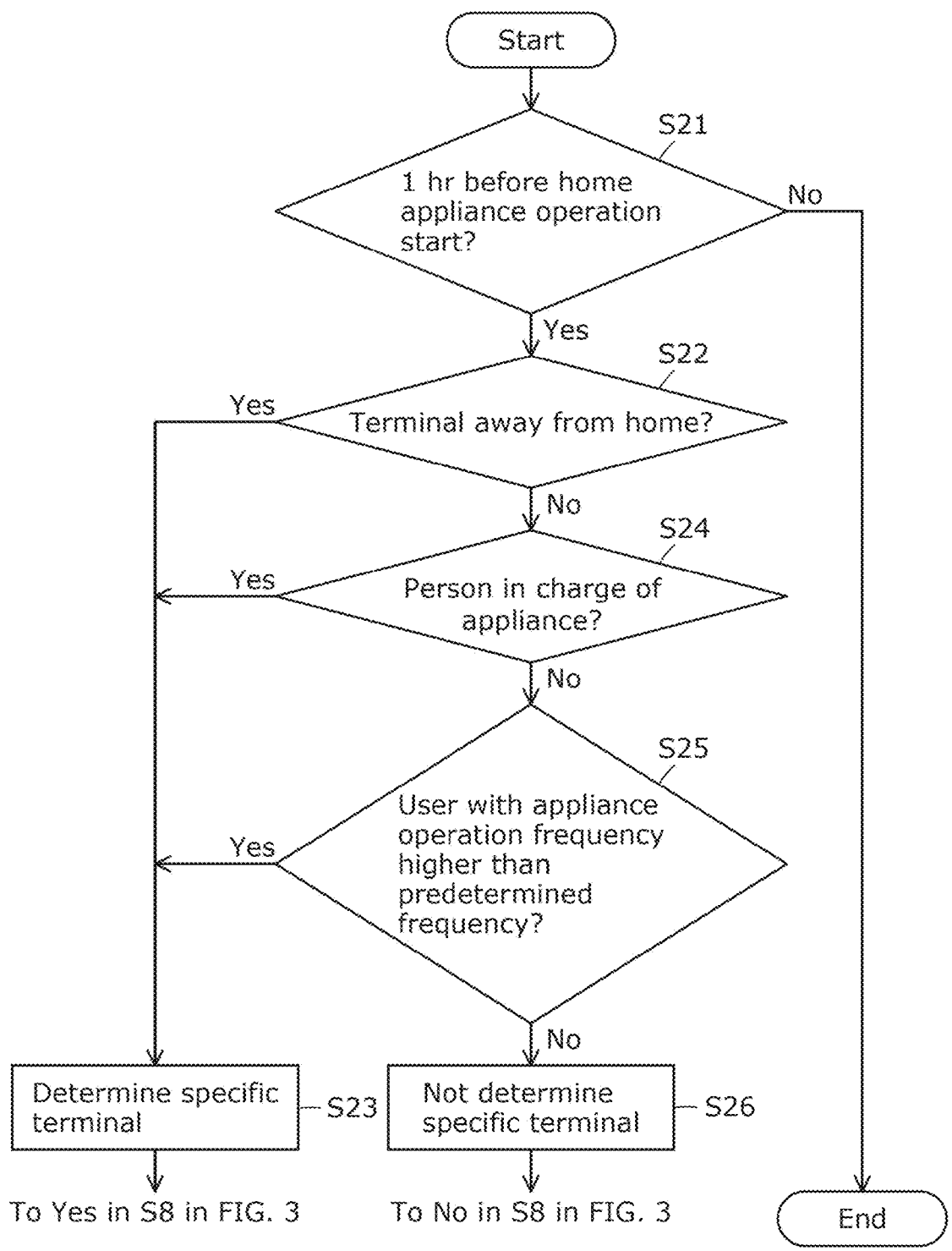
FIG. 5 is a flowchart illustrating another example of operation in Step S8 in FIG. 3.

FIG. 4 is a flowchart illustrating an example of operation in Step S8 in FIG. 3. FIG. 5 is a flowchart illustrating another example of operation in Step S8 in FIG. 3. Operation when information management server 18 determines the specific terminal will be described below, with reference to FIG. 4 and FIG. 5.

FIG. 4 illustrates an example of operation performed when information management server 18 determines the specific terminal in the case where the obtained state of appliance 12 is a home appliance operation halt error state. For example, the operation halt error state is a state in which, while appliance 12 is in operation, the operation of appliance 12 halts for some reason. For example, in the case where appliance 12 is a washing machine, the operation halt error state is a state in which washing halts because the water tap is closed or the filter is clogged (see FIG. 2).

As illustrated in FIG. 4, information management server 18 determines whether the obtained state of appliance 12 is the operation halt error state (Step S11). For example, suppose appliance 12 is a washing machine. In the case where the obtained state of appliance 12 is the washing halt state, information management server 18 determines that the obtained state of appliance 12 is the operation halt error state. For example, suppose appliance 12 is a washing machine. In the case where the obtained state of appliance 12 is the state of 1 hr before washing start, information management server 18 determines that the obtained state of appliance 12 is not the operation halt error state.

In the case where information management server 18 determines that the obtained state of appliance 12 is not the operation halt error state (Step S11: No), information management server 18 ends the process illustrated in FIG. 4, and performs another process depending on the obtained state of appliance 12.

In the case where information management server 18 determines that the obtained state of appliance 12 is the operation halt error state (Step S11: Yes), information management server 18 determines whether there is a terminal at home (Step S12). Specifically, information management server 18 determines whether there is a terminal at home out of first terminal 14 and second terminal 16. For example, information management server 18 identifies the position of first terminal 14 from the position information of first terminal 14 included in the first terminal information, and identifies the position of second terminal 16 from the position information of second terminal 16 included in the second terminal information. The position information can be obtained using the Global Positioning System (GPS) or the like. Information management server 18 sets the range of the house in which appliance 12 is installed, as a predetermined range beforehand. Information management server 18 then determines, for each of first terminal 14 and second terminal 16, whether the terminal is located within the predetermined range (the range of the house). In the case where at least one terminal out of first terminal 14 and second terminal 16 is located within the predetermined range, information management server 18 determines that there is a terminal at home. In the case where none of first terminal 14 and second terminal 16 is located within the predetermined range, information management server 18 determines that there is no terminal at home.

In the case where there is a terminal at home (Step S12: Yes), information management server 18 determines the terminal at home as the specific terminal (Step S13). Specifically, information management server 18 determines at least one terminal at home out of first terminal 14 and second terminal 16, as the specific terminal. For example, in the case where only first terminal 14 is at home, information management server 18 determines only first terminal 14 as the specific terminal. In the case where first terminal 14 and second terminal 16 are at home, information management server 18 determines each of first terminal 14 and second terminal 16 as the specific terminal. Thus, information management server 18 identifies the position of first terminal 14 and the position of second terminal 16 respectively from the position information of first terminal 14 and the position information of second terminal 16, and determines, as the specific terminal, a terminal located within the predetermined range out of first terminal 14 and second terminal 16.

In the case where there is no terminal at home (Step S12: No), information management server 18 determines whether there is a terminal near home (Step S14). Specifically, information management server 18 determines whether there is a terminal near home out of first terminal 14 and second terminal 16. For example, information management server 18 sets a predetermined range around the home beforehand. Information management server 18 then determines that there is the terminal near home if at least one of first terminal 14 and second terminal 16 is located within the predetermined range. If none of first terminal 14 and second terminal 16 is located within the predetermined range, information management server 18 determines that there is no terminal near home. For example, information management server 18 obtains the position information of first terminal 14 and the position information of second terminal 16 using the GPS. The predetermined range around the home is, for example, a range of a predetermined distance centering at the home.

In the case where information management server 18 determines that there is a terminal near home (Step S14: Yes), information management server 18 determines the terminal near home as the specific terminal (Step S13). Specifically, information management server 18 determines at least one terminal located near home out of first terminal 14 and second terminal 16, as the specific terminal. For example, in the case where only first terminal 14 is near home, information management server 18 determines only first terminal 14 as the specific terminal. In the case where first terminal 14 and second terminal 16 are near home, information management server 18 determines each of first terminal 14 and second terminal 16 as the specific terminal.

In the case where information management server 18 determines that there is no terminal near home (Step S14: No), information management server 18 determines whether there is a person in charge of appliance 12 (Step S15). Specifically, information management server 18 determines whether there is a person in charge of appliance 12 out of the first user and the second user registered in information management server 18. As an example, the first user or the second user may be determined as the person in charge of appliance 12 beforehand. Alternatively, the first user or the second user may be selected and determined depending on the day of week, the time of day, the operation history of first terminal 14, the operation history of second terminal 16, etc.

In the case where there is a person in charge of appliance 12 (Step S15: Yes), information management server 18 determines a terminal of the person in charge as the specific terminal. For example, in the case where, out of the first user associated with first terminal 14 and the second user associated with second terminal 16, the first user is a person in charge of appliance 12, information management server 18 determines first terminal 14 as the specific terminal.

In the case where there is no person in charge of appliance 12 (Step S15: No), information management server 18 determines whether there is a user whose operation frequency of appliance 12 is higher than a predetermined frequency (Step S16). For example, in the case where appliance 12 can be operated by operating any of first terminal 14 and second terminal 16, the operation frequency of appliance 12 by first terminal 14 (first user) can be calculated from the operation history of first terminal 14, and the operation frequency of appliance 12 by second terminal 16 (second user) can be calculated from the operation history of second terminal 16. If the operation frequency of appliance 12 by first terminal 14 (first user) is higher than the predetermined frequency, information management server 18 determines that there is a user whose operation frequency of appliance 12 is higher than the predetermined frequency. Likewise, if the operation frequency of appliance 12 by second terminal 16 (second user) is higher than the predetermined frequency, information management server 18 determines that there is a user whose operation frequency of appliance 12 is higher than the predetermined frequency.

As an example, a camera or the like may be installed. Then, the number of times appliance 12 is operated by the first user and the number of times appliance 12 is operated by the second user may be measured, and the operation frequencies may be calculated from the respective numbers of times appliance 12 is operated. As another example, appliance 12 may be provided with a fingerprint sensor. Then, the number of times appliance 12 is operated by the first user and the number of times appliance 12 is operated by the second user may be measured respectively based on the number of times the fingerprint sensor is touched by the first user and the number of times the fingerprint sensor is touched by the second user, and the operation frequencies may be calculated from the respective numbers of times appliance 12 is operated. As another example, a sound sensor may be installed. Then, the number of times appliance 12 is operated by the first user's voice and the number of times appliance 12 is operated by the second user's voice may be measured, and the operation frequencies may be calculated from the respective numbers of times appliance 12 is operated. Thus, the operation frequency of appliance 12 by each of the plurality of users (the first user and the second user) associated with the respective plurality of terminals (first terminal 14 and second terminal 16) may be calculated based on the operation history of appliance 12, and the specific terminal may be determined based on the operation frequency.

In the case where there is a user whose operation frequency of appliance 12 is higher than the predetermined frequency (Step S16: Yes), information management server 18 determines a terminal of the user as the specific terminal (Step S13). For example, in the case where the operation frequency of appliance 12 by the first user is higher than the predetermined frequency, first terminal 14 is determined as the specific terminal. Likewise, in the case where the operation frequency of appliance 12 by the second user is higher than the predetermined frequency, second terminal 16 is determined as the specific terminal. For example, a terminal of a user whose operation frequency of appliance 12 is highest of the first user and the second user may be determined as the specific terminal.

In the case where there is no user whose operation frequency of appliance 12 is higher than the predetermined frequency (Step S16: No), information management server 18 does not determine the specific terminal (Step S17).

FIG. 5 illustrates an example of operation performed when information management server 18 determines the specific terminal in the case where the obtained state of appliance 12 is a state of 1 hr before operation start. For example, the state of 1 hr before operation start is a state in which it is 1 hr before the start of operation of appliance 12. For example, in the case where appliance 12 is a washing machine and the operation of appliance 12 is scheduled to start at 20:00, at 19:00 appliance 12 is in the state of 1 hr before operation start.

As illustrated in FIG. 5, information management server 18 determines whether the obtained state of appliance 12 is the state of 1 hr before operation start (Step S21). For example, suppose appliance 12 is a washing machine. In the case where the obtained state of appliance 12 is the state of 1 hr before operation start, information management server 18 determines that the obtained state of appliance 12 is the state of 1 hr before operation start. For example, suppose appliance 12 is a washing machine. In the case where the obtained state of appliance 12 is the operation halt state, information management server 18 determines that the obtained state of appliance 12 is not the state of 1 hr before operation start.

In the case where information management server 18 determines that the obtained state of appliance 12 is not the state of 1 hr before operation start (Step S21: No), information management server 18 ends the process illustrated in FIG. 5, and performs another process depending on the obtained state of appliance 12.

In the case where information management server 18 determines that the obtained state of appliance 12 is the state of 1 hr before operation start (Step S21: Yes), information management server 18 determines whether there is a terminal away from home (Step S22). Specifically, information management server 18 determines whether there is a terminal away from home out of first terminal 14 and second terminal 16. For example, information management server 18 sets the range of the house in which appliance 12 is installed, as a predetermined range beforehand. Information management server 18 then determines, for each of first terminal 14 and second terminal 16, whether the terminal is located outside the predetermined range (the range of the house). In the case where at least one terminal out of first terminal 14 and second terminal 16 is located outside the predetermined range, information management server 18 determines that there is a terminal away from home. In the case where none of first terminal 14 and second terminal 16 is located outside the predetermined range, information management server 18 determines that there is no terminal away from home.

In the case where there is a terminal away from home (Step S22: Yes), information management server 18 determines the terminal away from home as the specific terminal (Step S23). Specifically, information management server 18 determines at least one terminal away from home out of first terminal 14 and second terminal 16, as the specific terminal. For example, in the case where only first terminal 14 is away from home, information management server 18 determines only first terminal 14 as the specific terminal. In the case where first terminal 14 and second terminal 16 are away from home, information management server 18 determines each of first terminal 14 and second terminal 16 as the specific terminal.

In the case where there is no terminal away from home (Step S22: No), information management server 18 determines whether there is a person in charge of appliance 12 (Step S24). The determination of whether there is a person in charge of appliance 12 has been described with regard to Step S15 above, and accordingly its description is omitted here.

In the case where there is a person in charge of appliance 12 (Step S24: Yes), information management server 18 determines a terminal of the person in charge as the specific terminal. For example, in the case where, out of the first user associated with first terminal 14 and the second user associated with second terminal 16, the first user is in charge of appliance 12, information management server 18 determines first terminal 14 as the specific terminal.

In the case where there is no person in charge of appliance 12 (Step S24: No), information management server 18 determines whether there is a user whose operation frequency of appliance 12 is higher than the predetermined frequency (Step S25). The determination of whether there is a user whose operation frequency of appliance 12 is higher than the predetermined frequency has been described with regard to Step S16 above, and accordingly its description is omitted here.

In the case where there is a user whose operation frequency of appliance 12 is higher than the predetermined frequency (Step S25: Yes), information management server 18 determines a terminal of the user as the specific terminal (Step S23). For example, in the case where the operation frequency of appliance 12 by the first user is higher than the predetermined frequency, information management server 18 determines first terminal 14 as the specific terminal. Likewise, in the case where the operation frequency of appliance 12 by the second user is higher than the predetermined frequency, information management server 18 determines second terminal 16 as the specific terminal.

In the case where there is no user whose operation frequency of appliance 12 is higher than the predetermined frequency (Step S25: No), information management server 18 does not determine the specific terminal (Step S26).

As an example, the specific terminal may be determined based on the remaining battery level of first terminal 14 included in the first terminal information and the remaining battery level of second terminal 16 included in the second terminal information. A terminal whose remaining battery level is higher than a predetermined level, for example, may be determined as the specific terminal. As another example, a terminal nearest appliance 12 may be determined as the specific terminal based on the position information of first terminal 14 included in the first terminal information and the position information of second terminal 16 included in the second terminal information. As another example, a terminal operated most recently may be determined as the specific terminal based on the operation history of first terminal 14 included in the first terminal information and the operation history of second terminal 16 included in the second terminal information.

Figure 6:
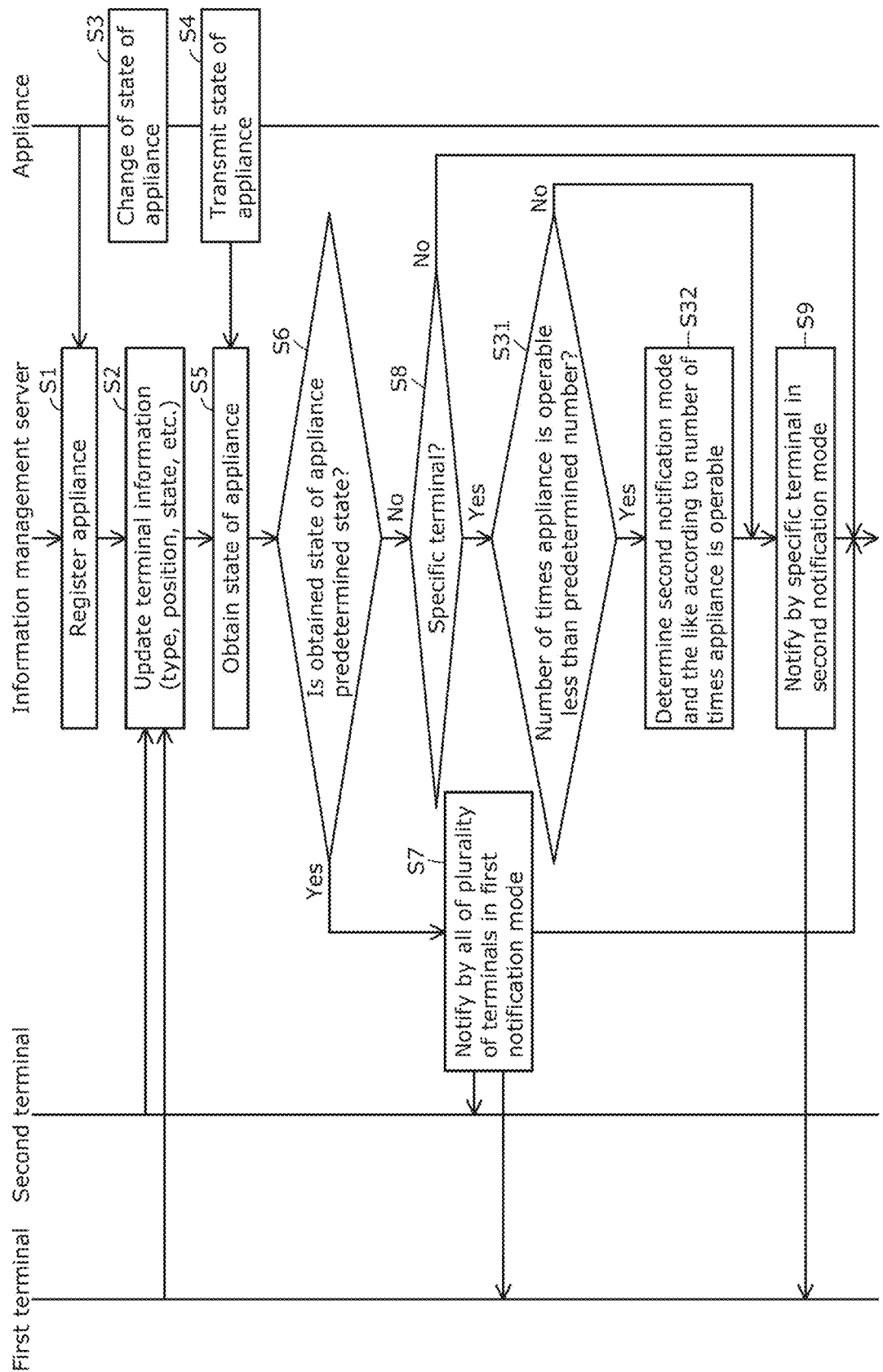
FIG. 6 is a flowchart illustrating another example of operation when the information management server controls notification by the plurality of terminals in the information processing system in FIG. 1.

FIG. 6 is a flowchart illustrating another example of operation when information management server 18 controls notification by first terminal 14 and second terminal 16 in information processing system 10 in FIG. 1. Another example of the operation of information management server 18 will be described below, with reference to FIG. 6.

FIG. 6 is a flowchart illustrating an example of operation when, in the case where the number of times appliance 12 is operable is less than a predetermined number, the notification mode and the like are determined according to the number of times appliance 12 is operable and control of notification by first terminal 14 and second terminal 16 is performed. For example, in the case where appliance 12 is a washing machine capable of storing a detergent, a softener, etc. for a plurality of operations, each time appliance 12 is operated, the remaining levels of the stored detergent, softener, etc. decrease. Hence, the number of times appliance 12 is operable is calculated based on the remaining levels of the stored detergent, softener, etc. In the case where the number is less than the predetermined number, the notification mode is determined according to the number and control is performed to make notification. The description of the same parts as those in the flowchart illustrated in FIG. 3 above may be omitted.

As illustrated in FIG. 6, in the case where information management server 18 determines that there is the specific terminal (Step S8: Yes), information management server 18 determines whether the number of times appliance 12 is operable is less than the predetermined number (Step S31). For example, in the case where appliance 12 is a washing machine capable of storing a detergent, a softener, etc. for a plurality of operations, the number of times appliance 12 is operable is calculated based on the remaining levels of the detergent, softener, etc. If the calculated number of times appliance 12 is operable is not less than the predetermined number, information management server 18 determines that the number of times appliance 12 is operable is not less than the predetermined number. If the calculated number of times appliance 12 is operable is less than the predetermined number, information management server 18 determines that the number of times appliance 12 is operable is less than the predetermined number.

In the case where information management server 18 determines that the number of times appliance 12 is operable is not less than the predetermined number (Step S31: No), information management server 18 performs control to cause the specific terminal to make notification in the second notification mode determined beforehand (Step S9).

In the case where information management server 18 determines that the number of times appliance 12 is operable is less than the predetermined number (Step S31: Yes), information management server 18 determines the second notification mode or the like according to the number of times appliance 12 is operable (Step S32). For example, when the number of times appliance 12 is operable is smaller, such a notification mode that makes notification using a larger number of means is determined. Specifically, for example, if the number of times appliance 12 is operable is five, notification is made only by displaying the state of appliance 12 on the display screen of the specific terminal. If the number of times appliance 12 is operable is four, on the other hand, notification is made not only by displaying the state of appliance 12 on the display screen of the specific terminal but also by reproducing sound from the specific terminal. Moreover, when the number of times appliance 12 is operable is smaller, such notification timing that makes notification repeatedly until the user confirms the notification may be determined.

For example, information management server 18 may determine whether there is a terminal at home based on SSID of Wi-Fi®, and determine the specific terminal. Specifically, if the SSID of Wi-Fi® to which first terminal 14 is connected and the SSID of Wi-Fi® to which appliance 12 is connected match, information management server 18 may determine that there is a terminal at home, and determine first terminal 14 as the specific terminal. If the SSID of Wi-Fi® to which second terminal 16 is connected and the SSID of Wi-Fi® to which appliance 12 is connected match, information management server 18 may determine that there is a terminal at home, and determine second terminal 16 as the specific terminal. If the SSID of Wi-Fi® to which first terminal 14 is connected and the SSID of Wi-Fi® to which second terminal 16 is connected do not match the SSID of Wi-Fi® to which appliance 12 is connected, information management server 18 may determine that there is no terminal at home.

For example, a sensor for detecting the first user and the second user may be installed in the house in which appliance 12 is installed. Information management server 18 may then determine whether there is a terminal at home and determine the specific terminal based on the detection result of the sensor. Specifically, in the case where the sensor detects the first user, information management server 18 may determine that there is a terminal at home, and determine first terminal 14 as the specific terminal. In the case where the sensor detects the second user, information management server 18 may determine that there is a terminal at home, and determine second terminal 16 as the specific terminal. In the case where the sensor detects neither the first user nor the second user, information management server 18 may determine that there is no terminal at home. Examples of the sensor include a camera, a human sensor included in an air conditioner and the like, and an open/close sensor for detecting opening/closing of a door.

For example, in the case where there is no terminal at home, information management server 18 may determine, for each of the first user and the second user, whether the user is on his or her way home, and determine the specific terminal. Specifically, in the case where the first user is on his or her way home, information management server 18 may determine first terminal 14 as the specific terminal. In the case where the second user is on his or her way home, information management server 18 may determine second terminal 16 as the specific terminal. For example, information management server 18 obtains the position information of first terminal 14 successively using the GPS, and, in the case where first terminal 14 is moving toward home, determines that the first user is on his or her way home. For example, information management server 18 obtains the position information of second terminal 16 using the GPS, and, in the case where second terminal 16 is moving toward home, determines that the second user is on his or her way home. For example, information management server 18 cooperates with a server of the management company of the apartment building in which the first user and the second user reside, and, in the case where the room number when automatically unlocking the entrance of the apartment building is the room number of the first user and the second user, determines that the first user or the second user is on his or her way home. In the case where the first user is on his or her way home, information management server 18 may estimate the timing at which the first user comes home, and make notification by first terminal 14 at the timing at which the first user comes home. In the case where the second user is on his or her way home, information management server 18 may estimate the timing at which the second user comes home, and make notification by second terminal 16 at the timing at which the second user comes home.

For example, in the case where the specific terminal is on the move, information management server 18 may suppress notification by the specific terminal. Specifically, information management server 18 may obtain the position information of the specific terminal successively using the GPS, and, in the case where the position of the specific terminal changes, determine that the specific terminal is on the move and suppress notification by the specific terminal. Information management server 18 may determine such time of day during which the specific terminal is on the move, such as commuting hours, beforehand, and determine that the specific terminal is on the move and suppress notification by the specific terminal during the time of day.

For example, in the case where there are a plurality of specific terminals, only notification by a terminal having higher priority of the plurality of specific terminals may be made. Specifically, in the case where first terminal 14 has higher priority than second terminal 16 for appliance 12 and both first terminal 14 and second terminal 16 are specific terminals, only notification by first terminal 14 out of first terminal 14 and second terminal 16 may be made. The priority is, for example, set for each appliance beforehand.

For example, in the case where there are a plurality of specific terminals, notification by a terminal with which a plurality of users can visually recognize the notification easily, such as a television, may be made preferentially. Specifically, in the case where first terminal 14 is a television and second terminal 16 is a smartphone and both first terminal 14 and second terminal 16 are specific terminals, only notification by first terminal 14 out of first terminal 14 and second terminal 16 may be made.

Information processing system 10 according to the embodiment has been described above.

As described above, information management server 18: obtains information defining, for each state of a plurality of possible states of appliance 12, whether the state is a predetermined state that requires notification by all of a plurality of terminals (first terminal 14 and second terminal 16); obtains a state of appliance 12; determines whether the state of appliance 12 obtained is the predetermined state; performs control to cause all of first terminal 14 and second terminal 16 to make the notification, when it is determined that the state of appliance 12 is the predetermined state; and performs control to cause a specific terminal out of first terminal 14 and second terminal 16 to make the notification, when it is determined that the state of appliance 12 is not the predetermined state.

Thus, information management server 18 obtains the state of appliance 12, and performs control to cause the specific terminal out of first terminal 14 and second terminal 16 to make notification in the case where information management server 18 determines that the state of appliance 12 is not the predetermined state. In this case, communication with both first terminal 14 and second terminal 16 is unnecessary, so that an increase in communication volume can be prevented.

Information management server 18 performs control to cause each terminal other than the specific terminal out of first terminal 14 and second terminal 16 not to make the notification, when it is determined that the state of appliance 12 is not the predetermined state.

Thus, information management server 18 performs control to cause each terminal other than the specific terminal not to make notification. Since communication with other than the specific terminal is unnecessary, an increase in communication volume can be further prevented.

Information management server 18: determines a first notification mode that is a notification mode and performs the control to cause all of first terminal 14 and second terminal 16 to make the notification in the first notification mode, when it is determined that the state of appliance 12 is the predetermined state; and determines a second notification mode that is a notification mode different from the first notification mode and performs the control to cause the specific terminal to make the notification in the second notification mode, when it is determined that the state of appliance 12 is not the predetermined state.

Thus, the notification mode differs between the case where information management server 18 determines that the state of appliance 12 is the predetermined state and the case where information management server 18 determines that the state of appliance 12 is not the predetermined state. Hence, the user can easily recognize whether the state of appliance 12 is the predetermined state.

The first notification mode includes a mode in which the state of appliance 12 is displayed on a display screen of each of first terminal 14 and second terminal 16 and sound is reproduced from each of first terminal 14 and second terminal 16, and the second notification mode includes only one mode out of a mode in which the state of appliance 12 is displayed on a display screen of the specific terminal and a mode in which sound is reproduced from the specific terminal.

Thus, the second notification mode includes only one of the mode in which the state of appliance 12 is displayed on the display screen and the mode in which sound is reproduced, whereas the first notification mode includes both of the mode in which the state of appliance 12 is displayed on the display screen and the mode in which sound is reproduced. Accordingly, notification in the first notification mode is more easily recognizable to the user than notification in the second notification mode, and the user can easily recognize that the state of appliance 12 is the predetermined state.

Information management server 18 further obtains terminal information about each of first terminal 14 and second terminal 16, and determines the specific terminal based on the terminal information.

Thus, by determining the specific terminal based on the terminal information, an appropriate terminal out of first terminal 14 and second terminal 16 can be selected to make notification while preventing an increase in communication volume. The terminal information includes position information of each of the plurality of terminals (first terminal 14 and second terminal 16), and information management server 18 determines the specific terminal based on the position information.

Thus, by determining the specific terminal based on the position information, a terminal located at an appropriate position out of first terminal 14 and second terminal 16 can be selected to make notification while preventing an increase in communication volume.

Information management server 18: identifies a position of each of first terminal 14 and second terminal 16 from the position information; and determines, as the specific terminal, a terminal located within a predetermined range out of first terminal 14 and second terminal 16.

Thus, by determining the terminal located within the predetermined range as the specific terminal, a terminal located within an appropriate range, such as in the house, out of first terminal 14 and second terminal 16 can be selected to make notification while preventing an increase in communication volume.

The terminal information includes an operation history of each of first terminal 14 and second terminal 16, and information management server 18 determines the specific terminal based on the operation history.

Thus, for example, the time of day during which first terminal 14 is operated and the time of day during which second terminal 16 is operated can be determined respectively from the operation history of first terminal 14 and the operation history of second terminal 16. Hence, an appropriate terminal can be selected to make notification depending on, for example, the time of day in which notification is made, while preventing an increase in communication volume.

Appliance 12 is operable by operating any of first terminal 14 and second terminal 16, and information management server 18: calculates an operation frequency of appliance 12 for each of first terminal 14 and second terminal 16, from the operation history, and determines, as the specific terminal, a terminal whose operation frequency is higher than a predetermined frequency out of first terminal 14 and second terminal 16.

Thus, by causing the terminal whose operation frequency of appliance 12 is higher of first terminal 14 and second terminal 16 to make notification, the state of appliance 12 can be easily notified to the user whose operation frequency of appliance 12 is higher while preventing an increase in communication volume.

Information management server 18 determines a timing of causing the specific terminal to make the notification based on the operation history.

Thus, notification by the specific terminal can be easily made, for example, in the time of day during which the specific terminal is operated, so that the state of the appliance can be easily notified to the user while preventing an increase in communication volume.

While the information processing method, etc. according to the present invention have been described above by way of an embodiment, the present invention is not limited to such embodiment.

Although the foregoing embodiment describes the case where information processing system 10 includes two terminals (first terminal 14 and second terminal 16), the present invention is not limited to such. For example, the information processing system may include three or more terminals.

Although the foregoing embodiment describes the case where information processing system 10 includes one appliance 12, the present invention is not limited to such. For example, the information processing system may include two or more appliances.

Although the foregoing embodiment describes the case where one appliance 12 is associated with two terminals (first terminal 14 and second terminal 16) in information processing system 10, the present invention is not limited to such. For example, one appliance may be associated with three or more terminals in the information processing system.

Although the foregoing embodiment describes the case where first terminal 14 and second terminal 16 can operate appliance 12, for example, first terminal 14 and second terminal 16 may each be a terminal having installed therein an application for operating appliance 12 and/or determining the state of appliance 12. In this case, information management server 18 may determine a terminal whose use frequency of the application or operation frequency of appliance 12 through the application is higher than a predetermined frequency out of first terminal 14 and second terminal 16, as the specific terminal. Moreover, when registering the information of appliance 12 in information management server 18 using the application, a person in charge of appliance 12 may be set. In the case where there are a plurality of appliances, a person in charge may be set for each of the plurality of appliances. The person in charge of appliance 12 that has been set using the application may be changeable.

The present invention can be implemented not only as the information processing method, etc. according to the foregoing embodiment but also as a program for achieving the functions of the information management server as an information processing device. The present invention can also be implemented as a computer-readable recording medium, such as DVD, having the program recorded thereon.

Each of the structural elements in the foregoing embodiment may be implemented by executing a software program suitable for the structural element. Each of the structural elements may be implemented by means of a program executing unit, such as a CPU or a processor, reading and executing the software program recorded on a recording medium such as a hard disk or a semiconductor memory.

Each of the structural elements may be implemented by hardware. For example, the structural elements may be circuits (or integrated circuits). These circuits may constitute one circuit as a whole, or may be separate circuits. These circuits may each be a general-purpose circuit or a dedicated circuit.

Other modifications obtained by applying various changes conceivable by a person skilled in the art to each embodiment of the structural elements and functions in each embodiment without departing from the scope of the present invention are also included in the present invention.

INDUSTRIAL APPLICABILITY

The present invention can be used for a method of controlling notification by a plurality of terminals associated with an appliance.

The invention claimed is:

1. An information processing method executed by a computer to control notification related to an appliance by a plurality of terminals associated with the appliance, the appliance being operable by operating each of the plurality of terminals, the information processing method comprising:
obtaining information defining, for each state of a plurality of possible states of the appliance, whether the appliance is in a predetermined state that requires the notification related to the appliance by all of the plurality of terminals;
obtaining a state of the appliance;
determining whether the state of the appliance obtained is the predetermined state;
when it is determined that the state of the appliance is the predetermined state, performing the control to cause all of the plurality of terminals to make the notification related to the appliance with a first notification manner;
when it is determined that the state of the appliance is not the predetermined state, performing the control to cause one or more specific terminals among the all of the plurality of terminals, which are less than all the plurality of terminals, to make the notification related to the appliance with a second notification manner different from the first notification manner,
obtaining terminal information about each of the plurality of terminals, the terminal information including an operation history of each of the plurality of terminals;
calculating an operation frequency of the appliance for each of the plurality of terminals, from the operation history, and
determining, as the one or more specific terminals, one or more terminals whose operation frequency is higher than a predetermined frequency out of the plurality of terminals.

2. The information processing method according to claim 1, comprising:
performing control to cause each terminal other than the one or more specific terminals out of the plurality of terminals not to make the notification related to the appliance, when it is determined that the state of the appliance is not the predetermined state.

3. The information processing method according to claim 1,
wherein the first notification manner includes displaying the state of the appliance on a display screen of each of all of the plurality of terminals and reproducing sound from each of all of the plurality of terminals, and
the second notification manner includes only either one of displaying the state of the appliance on a display screen of the one or more specific terminals or reproducing sound from the one or more specific terminals.

4. The information processing method according to claim 1,
wherein the terminal information includes position information of each of the plurality of terminals, and
the determining of the one or more specific terminals includes determining the specific terminal based on the position information.

5. The information processing method according to claim 4, comprising:
identifying a position of each of the plurality of terminals from the position information, and
the determining of the one or more specific terminals includes determining, as the one or more specific terminals, one or more terminals located within a predetermined range out of the plurality of terminals.

6. The information processing method according to claim 1, comprising:
determining a timing of causing the one or more specific terminals to make the notification related to the appliance based on the operation history.

7. A non-transitory computer-readable recording medium having recorded thereon program for causing a computer to execute the information processing method according to claim 1.

8. An information processing device that controls notification related to an appliance by a plurality of terminals associated with the appliance, the appliance being operable by operating each of the plurality of terminals, the information processing device comprising:
a first obtainer that obtains information defining, for each state of a plurality of possible states of the appliance, whether the appliance is in a predetermined state that requires the notification related to the appliance by all of the plurality of terminals;
a second obtainer that obtains a state of the appliance;
a determiner that determines whether the state of the appliance obtained is the predetermined state; and
a controller that
performs the control to cause all of the plurality of terminals to make the notification related to the appliance with a first notification manner when it is determined that the state of the appliance is the predetermined state;
performs the control to cause one or more specific terminals among all of the plurality of terminals, which are less than all of the plurality of terminals, to make the notification related to the appliance with a second notification manner different from the first notification manner, when it is determined that the state of the appliance is not the predetermined state;

obtains terminal information about each of the plurality of terminals, the terminal information including an operation history of each of the plurality of terminals;

calculates an operation frequency of the appliance for each of the plurality of terminals, from the operation history, and determines, as the one or more specific terminals, one or more terminals whose operation frequency is higher than a predetermined frequency out of the plurality of terminals.

9. The information processing device according to claim 8, wherein the first notification manner includes displaying the state of the appliance on a display screen of each of all of the plurality of terminals and reproducing sound from each of all of the plurality of terminals, and the second notification manner includes only either one of displaying the state of the appliance on a display screen of the one or more specific terminals or reproducing sound from the one or more specific terminals.

\* \* \* \* \*